(12) United States Patent
Landau et al.

(10) Patent No.: US 10,762,102 B2
(45) Date of Patent: Sep. 1, 2020

(54) SYSTEM AND METHOD FOR INCREMENTAL REPLICATION

(71) Applicant: Palantir Technologies Inc., Palo Alto, CA (US)

(72) Inventors: Alexander Landau, Palo Alto, CA (US); Tim Wilson, Palo Alto, CA (US); Richard Allen Ducott, III, Burlingame, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 309 days.

(21) Appl. No.: 15/704,529

(22) Filed: Sep. 14, 2017

(65) Prior Publication Data

US 2018/0004832 A1    Jan. 4, 2018

Related U.S. Application Data

(63) Continuation of application No. 14/537,367, filed on Nov. 10, 2014, now Pat. No. 9,785,694, which is a continuation of application No. 13/922,437, filed on Jun. 20, 2013, now Pat. No. 8,886,601.

(51) Int. Cl.
  *G06F 16/20* (2019.01)
  *G06F 16/27* (2019.01)
  *G06F 16/23* (2019.01)

(52) U.S. Cl.
  CPC ......... *G06F 16/27* (2019.01); *G06F 16/2358* (2019.01); *G06F 16/273* (2019.01)

(58) Field of Classification Search
  None
  See application file for complete search history.

(56) References Cited

U.S. PATENT DOCUMENTS

| | | |
|---|---|---|
| 5,548,749 A | 8/1996 | Kroenke et al. |
| 5,708,828 A | 1/1998 | Coleman |
| 5,765,171 A | 6/1998 | Gehani et al. |
| 5,826,021 A | 10/1998 | Mastors et al. |
| 5,832,218 A | 11/1998 | Gibbs et al. |
| 5,878,434 A | 3/1999 | Draper et al. |
| 5,897,636 A | 4/1999 | Kaeser |

(Continued)

FOREIGN PATENT DOCUMENTS

| | | |
|---|---|---|
| AU | 2011279270 | 9/2015 |
| CN | 102054015 | 5/2014 |

(Continued)

OTHER PUBLICATIONS

U.S. Appl. No. 14/552,336, filed Nov. 24, 2014, Notice of Allowance, dated Nov. 3, 2015.

(Continued)

*Primary Examiner* — Belix M Ortiz Ditren
(74) *Attorney, Agent, or Firm* — Hickman Palermo Becker Bingham LLP; Adam C. Stone

(57) ABSTRACT

A method of incrementally replicating investigative analysis data is disclosed along with a system for performing the same. The method and system provide the ability to break a data replication job into multiple "replication chunks" which can be exported and imported separately. By doing so, the method and system can efficiently replicate large numbers of data object changes over an unreliable data network.

21 Claims, 9 Drawing Sheets

(56) References Cited

U.S. PATENT DOCUMENTS

| | | |
|---|---|---|
| 5,966,706 A | 10/1999 | Biliris et al. |
| 6,006,242 A | 12/1999 | Poole et al. |
| 6,057,757 A | 5/2000 | Arrowsmith et al. |
| 6,098,078 A | 8/2000 | Gehani et al. |
| 6,134,582 A | 10/2000 | Kennedy |
| 6,190,053 B1 | 2/2001 | Stahlecker et al. |
| 6,202,085 B1 | 3/2001 | Benson et al. |
| 6,216,140 B1 | 4/2001 | Kramer |
| 6,240,414 B1 | 5/2001 | Beizer et al. |
| 6,243,717 B1 | 6/2001 | Gordon et al. |
| 6,317,754 B1 | 11/2001 | Peng |
| 6,374,252 B1 | 4/2002 | Althoff et al. |
| 6,430,305 B1 | 8/2002 | Decker |
| 6,463,404 B1 | 10/2002 | Appleby |
| 6,519,627 B1 | 2/2003 | Dan et al. |
| 6,523,019 B1 | 2/2003 | Borthwick |
| 6,523,172 B1 | 2/2003 | Martinez-Guerra et al. |
| 6,539,381 B1 | 3/2003 | Prasad et al. |
| 6,560,620 B1 | 5/2003 | Ching |
| 6,816,941 B1 | 11/2004 | Carlson et al. |
| 7,058,648 B1 | 6/2006 | Lightfoot et al. |
| 7,072,911 B1 | 7/2006 | Doman |
| 7,089,541 B2 | 8/2006 | Ungar |
| 7,167,877 B2 | 1/2007 | Balogh et al. |
| 7,403,942 B1 | 7/2008 | Bayliss |
| 7,437,664 B2 | 10/2008 | Borson |
| 7,461,158 B2 | 12/2008 | Rider et al. |
| 7,596,285 B2 | 9/2009 | Brown et al. |
| 7,627,489 B2 | 12/2009 | Schaeffer et al. |
| 7,676,788 B1 | 3/2010 | Ousterhout et al. |
| 7,730,396 B2 | 6/2010 | Chidlovskii et al. |
| 7,739,246 B2 | 6/2010 | Mooney et al. |
| 7,757,220 B2 | 7/2010 | Griffith et al. |
| 7,877,421 B2 | 1/2011 | Berger et al. |
| 7,912,842 B1 | 3/2011 | Bayliss |
| 7,962,495 B2 | 6/2011 | Jain et al. |
| 8,015,151 B2 | 9/2011 | Lier et al. |
| 8,117,022 B2 | 2/2012 | Linker |
| 8,126,848 B2 | 2/2012 | Wagner |
| 8,290,838 B1 | 10/2012 | Thakur et al. |
| 8,290,990 B2 | 10/2012 | Drath et al. |
| 8,301,904 B1 | 10/2012 | Gryaznov |
| 8,302,855 B2 | 11/2012 | Ma et al. |
| 8,312,546 B2 | 11/2012 | Alme |
| 8,316,060 B1 | 11/2012 | Snyder et al. |
| 8,364,642 B1 | 1/2013 | Garrod |
| 8,380,659 B2 | 2/2013 | Zunger |
| 8,386,377 B1 | 2/2013 | Xiong et al. |
| 8,417,715 B1 | 4/2013 | Bruckhaus et al. |
| 8,429,527 B1 | 4/2013 | Arbogast |
| 8,442,940 B1 | 5/2013 | Faletti et al. |
| 8,515,912 B2 | 8/2013 | Garrod et al. |
| 8,527,461 B2 | 9/2013 | Ducott, III et al. |
| 8,554,719 B2 | 10/2013 | McGrew |
| 8,601,326 B1 | 12/2013 | Kirn |
| 8,639,552 B1 | 1/2014 | Chen et al. |
| 8,646,080 B2 | 2/2014 | Williamson et al. |
| 8,688,573 B1 | 4/2014 | Ruknoic et al. |
| 8,688,749 B1 | 4/2014 | Ducott, III et al. |
| 8,726,379 B1 | 5/2014 | Stiansen et al. |
| 8,782,004 B2 | 7/2014 | Ducott, III et al. |
| 8,798,354 B1 | 8/2014 | Bunzel et al. |
| 8,812,444 B2 | 8/2014 | Garrod et al. |
| 8,838,538 B1 | 9/2014 | Landau et al. |
| 8,855,999 B1 | 10/2014 | Elliot |
| 8,886,601 B1 | 11/2014 | Landau et al. |
| 8,903,717 B2 | 12/2014 | Elliot |
| 8,924,388 B2 | 12/2014 | Elliot et al. |
| 8,924,389 B2 | 12/2014 | Elliot et al. |
| 8,938,434 B2 | 1/2015 | Jain et al. |
| 8,938,686 B1 | 1/2015 | Erenrich et al. |
| 9,009,827 B1 | 4/2015 | Albertson et al. |
| 9,105,000 B1 | 8/2015 | White et al. |
| 9,189,492 B2 | 11/2015 | Ducott, III et al. |
| 9,230,060 B2 | 1/2016 | Friedlander et al. |
| 9,330,157 B2 | 5/2016 | Ducott, III et al. |
| 9,501,552 B2 | 11/2016 | McGrew et al. |
| 9,569,070 B1 | 2/2017 | Ma et al. |
| 9,715,518 B2 | 7/2017 | Ducott, III et al. |
| 9,785,694 B2 | 10/2017 | Landau et al. |
| 2002/0035590 A1 | 3/2002 | Eibach et al. |
| 2002/0095360 A1 | 7/2002 | Joao |
| 2002/0103705 A1 | 8/2002 | Brady |
| 2002/0194058 A1 | 12/2002 | Eldering |
| 2003/0084017 A1 | 5/2003 | Ordille |
| 2003/0088438 A1 | 5/2003 | Maughan et al. |
| 2003/0088654 A1 | 5/2003 | Good et al. |
| 2003/0093401 A1 | 5/2003 | Czahkowski et al. |
| 2003/0105759 A1 | 6/2003 | Bess et al. |
| 2003/0115481 A1 | 6/2003 | Baird et al. |
| 2003/0126102 A1 | 7/2003 | Borthwick |
| 2003/0171942 A1 | 9/2003 | Gaito |
| 2003/0177112 A1 | 9/2003 | Gardner |
| 2003/0182313 A1 | 9/2003 | Federwisch |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0083466 A1 | 4/2004 | Dapp et al. |
| 2004/0088177 A1 | 5/2004 | Travis et al. |
| 2004/0103124 A1 | 5/2004 | Kupkova |
| 2004/0111390 A1 | 6/2004 | Saito et al. |
| 2004/0117387 A1 | 6/2004 | Civetta et al. |
| 2004/0153451 A1 | 8/2004 | Phillips et al. |
| 2004/0210763 A1 | 10/2004 | Jonas |
| 2004/0236688 A1 | 11/2004 | Bozeman |
| 2004/0250576 A1 | 12/2004 | Flanders |
| 2005/0010472 A1 | 1/2005 | Quatse et al. |
| 2005/0034107 A1 | 2/2005 | Kendall et al. |
| 2005/0044088 A1 | 2/2005 | Lindsay et al. |
| 2005/0097441 A1 | 5/2005 | Herbach et al. |
| 2005/0102328 A1 | 5/2005 | Ring et al. |
| 2005/0108063 A1 | 5/2005 | Madill et al. |
| 2005/0131935 A1 | 6/2005 | O'Leary et al. |
| 2005/0193024 A1 | 9/2005 | Beyer et al. |
| 2005/0251786 A1 | 11/2005 | Citron et al. |
| 2005/0262512 A1 | 11/2005 | Schmidt et al. |
| 2006/0010130 A1 | 1/2006 | Leff et al. |
| 2006/0036568 A1 | 2/2006 | Moore et al. |
| 2006/0080283 A1 | 4/2006 | Shipman |
| 2006/0080316 A1 | 4/2006 | Gilmore et al. |
| 2006/0106879 A1 | 5/2006 | Zondervan et al. |
| 2006/0143075 A1 | 6/2006 | Carr et al. |
| 2006/0155945 A1 | 7/2006 | McGarvey |
| 2006/0178954 A1 | 8/2006 | Thukral et al. |
| 2006/0190497 A1 | 8/2006 | Inturi et al. |
| 2006/0206866 A1 | 9/2006 | Eldrige et al. |
| 2006/0218206 A1 | 9/2006 | Bourbonnais et al. |
| 2006/0218491 A1 | 9/2006 | Grossman et al. |
| 2006/0218637 A1 | 9/2006 | Thomas et al. |
| 2006/0253502 A1 | 11/2006 | Raman et al. |
| 2007/0000999 A1 | 1/2007 | Kubo et al. |
| 2007/0005707 A1 | 1/2007 | Teodosiu et al. |
| 2007/0026373 A1 | 2/2007 | Suriyanarayanan et al. |
| 2007/0067285 A1 | 3/2007 | Blume |
| 2007/0112887 A1 | 5/2007 | Liu et al. |
| 2007/0162454 A1 | 7/2007 | D'Albora et al. |
| 2007/0168516 A1 | 7/2007 | Liu et al. |
| 2007/0178501 A1 | 8/2007 | Rabinowitz et al. |
| 2007/0180075 A1* | 8/2007 | Chasman ............... G06F 16/27 709/223 |
| 2007/0192122 A1 | 8/2007 | Routson et al. |
| 2007/0220328 A1 | 9/2007 | Liu et al. |
| 2007/0233756 A1 | 10/2007 | D'Souza |
| 2007/0271317 A1 | 11/2007 | Carmel |
| 2007/0284433 A1 | 12/2007 | Domenica et al. |
| 2007/0295797 A1 | 12/2007 | Herman et al. |
| 2007/0299697 A1 | 12/2007 | Friedlander et al. |
| 2007/0299887 A1 | 12/2007 | Novik et al. |
| 2008/0005063 A1 | 1/2008 | Seeds |
| 2008/0005188 A1 | 1/2008 | Li et al. |
| 2008/0027981 A1 | 1/2008 | Wahl |
| 2008/0033753 A1 | 2/2008 | Canda et al. |
| 2008/0086718 A1 | 4/2008 | Bostick et al. |

(56) References Cited

U.S. PATENT DOCUMENTS

| | | |
|---|---|---|
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0141117 A1 | 6/2008 | King et al. |
| 2008/0148398 A1 | 6/2008 | Mezack et al. |
| 2008/0189240 A1 | 8/2008 | Mullins et al. |
| 2008/0195672 A1 | 8/2008 | Hamel et al. |
| 2008/0208735 A1 | 8/2008 | Balet et al. |
| 2008/0228467 A1 | 9/2008 | Womack et al. |
| 2008/0235575 A1 | 9/2008 | Weiss |
| 2008/0243951 A1 | 10/2008 | Webman et al. |
| 2008/0267386 A1 | 10/2008 | Cooper |
| 2008/0270316 A1 | 10/2008 | Guidotti et al. |
| 2008/0281580 A1 | 11/2008 | Zabokritski |
| 2008/0301042 A1 | 12/2008 | Patzer |
| 2008/0313132 A1 | 12/2008 | Hao et al. |
| 2008/0320299 A1 | 12/2008 | Wobber et al. |
| 2009/0055487 A1 | 2/2009 | Moraes et al. |
| 2009/0094270 A1 | 4/2009 | Alirez et al. |
| 2009/0106178 A1 | 4/2009 | Chu |
| 2009/0106242 A1 | 4/2009 | McGrew |
| 2009/0112745 A1 | 4/2009 | Stefanescu |
| 2009/0157732 A1 | 6/2009 | Hao et al. |
| 2009/0164387 A1 | 6/2009 | Armstrong et al. |
| 2009/0172821 A1 | 7/2009 | Daira et al. |
| 2009/0187546 A1 | 7/2009 | Whyte et al. |
| 2009/0199090 A1 | 8/2009 | Poston et al. |
| 2009/0228365 A1 | 9/2009 | Tomchek et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0299830 A1 | 12/2009 | West et al. |
| 2009/0307049 A1 | 12/2009 | Elliott et al. |
| 2009/0313311 A1 | 12/2009 | Hoffmann et al. |
| 2009/0313463 A1 | 12/2009 | Pang et al. |
| 2009/0319418 A1 | 12/2009 | Herz |
| 2009/0319515 A1 | 12/2009 | Minton et al. |
| 2010/0011000 A1 | 1/2010 | Chakra et al. |
| 2010/0057622 A1 | 3/2010 | Faith et al. |
| 2010/0070531 A1 | 3/2010 | Aymeloglu et al. |
| 2010/0070842 A1 | 3/2010 | Aymeloglu et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0100963 A1 | 4/2010 | Mahaffey |
| 2010/0114817 A1 | 5/2010 | Broeder et al. |
| 2010/0145909 A1 | 6/2010 | Ngo |
| 2010/0179941 A1* | 7/2010 | Agrawal ............ G06F 11/1451 707/624 |
| 2010/0204983 A1 | 8/2010 | Chung et al. |
| 2010/0306285 A1 | 12/2010 | Shah et al. |
| 2010/0330801 A1 | 12/2010 | Rouh |
| 2011/0004626 A1 | 1/2011 | Naeymi-Rad et al. |
| 2011/0010342 A1 | 1/2011 | Chen et al. |
| 2011/0066497 A1 | 3/2011 | Gopinath et al. |
| 2011/0093327 A1 | 4/2011 | Fordyce, III et al. |
| 2011/0099133 A1 | 4/2011 | Chang et al. |
| 2011/0173093 A1 | 7/2011 | Psota et al. |
| 2011/0208565 A1 | 8/2011 | Ross et al. |
| 2011/0208822 A1 | 8/2011 | Rathod |
| 2011/0219450 A1 | 9/2011 | McDougal et al. |
| 2011/0225586 A1 | 9/2011 | Bentley et al. |
| 2011/0246229 A1 | 10/2011 | Pacha |
| 2011/0252282 A1 | 10/2011 | Meek et al. |
| 2011/0258216 A1 | 10/2011 | Supakkul et al. |
| 2012/0005159 A1 | 1/2012 | Wang et al. |
| 2012/0013684 A1 | 1/2012 | Robertson et al. |
| 2012/0016849 A1 | 1/2012 | Garrod et al. |
| 2012/0022945 A1 | 1/2012 | Falkenborg et al. |
| 2012/0023075 A1 | 1/2012 | Pulfer et al. |
| 2012/0036106 A1 | 2/2012 | Desai et al. |
| 2012/0059853 A1 | 3/2012 | Jagota |
| 2012/0066661 A1 | 3/2012 | Balani et al. |
| 2012/0078595 A1 | 3/2012 | Balandin et al. |
| 2012/0084287 A1 | 4/2012 | Lakshminarayan et al. |
| 2012/0089606 A1 | 4/2012 | Eshwar et al. |
| 2012/0136804 A1 | 5/2012 | Lucia |
| 2012/0191446 A1 | 7/2012 | Binsztok et al. |
| 2012/0215784 A1 | 8/2012 | King et al. |
| 2012/0254129 A1 | 10/2012 | Wheeler et al. |
| 2013/0006655 A1 | 1/2013 | Van Arkel et al. |
| 2013/0006668 A1 | 1/2013 | Van Arkel et al. |
| 2013/0006947 A1 | 1/2013 | Akinyemi et al. |
| 2013/0067017 A1* | 3/2013 | Carriere ............ G06Q 10/06 709/208 |
| 2013/0096968 A1 | 4/2013 | Van Pelt et al. |
| 2013/0097130 A1 | 4/2013 | Bingol et al. |
| 2013/0124193 A1 | 5/2013 | Holmberg |
| 2013/0132348 A1 | 5/2013 | Garrod |
| 2013/0151453 A1 | 6/2013 | Bhanot et al. |
| 2013/0166480 A1 | 6/2013 | Popescu et al. |
| 2013/0173540 A1 | 7/2013 | Qian et al. |
| 2013/0191336 A1 | 7/2013 | Ducott et al. |
| 2013/0191338 A1 | 7/2013 | Ducott, III et al. |
| 2013/0226879 A1 | 8/2013 | Talukder et al. |
| 2013/0226944 A1 | 8/2013 | Baid et al. |
| 2013/0246316 A1 | 9/2013 | Zhao et al. |
| 2013/0263019 A1 | 10/2013 | Castellanos et al. |
| 2013/0276799 A1 | 10/2013 | Davidson |
| 2013/0325826 A1 | 12/2013 | Agarwal et al. |
| 2013/0346444 A1 | 12/2013 | Makkar et al. |
| 2014/0006404 A1 | 1/2014 | McGrew et al. |
| 2014/0040182 A1 | 2/2014 | Gilder et al. |
| 2014/0040714 A1 | 2/2014 | Siegel et al. |
| 2014/0081652 A1 | 3/2014 | Klindworth |
| 2014/0095363 A1 | 4/2014 | Caldwell |
| 2014/0108074 A1 | 4/2014 | Miller et al. |
| 2014/0114972 A1 | 4/2014 | Ducott et al. |
| 2014/0129518 A1 | 5/2014 | Ducott et al. |
| 2014/0149130 A1 | 5/2014 | Getchius |
| 2014/0222793 A1 | 8/2014 | Sadkin et al. |
| 2014/0358829 A1 | 12/2014 | Hurwitz |
| 2015/0012509 A1 | 1/2015 | Kirn |
| 2015/0046481 A1 | 2/2015 | Elliot |
| 2015/0074050 A1 | 3/2015 | Landau et al. |
| 2015/0106379 A1 | 4/2015 | Elliot et al. |
| 2015/0235334 A1 | 8/2015 | Wang et al. |
| 2015/0261847 A1 | 9/2015 | Ducott et al. |
| 2016/0019252 A1 | 1/2016 | Ducott et al. |

FOREIGN PATENT DOCUMENTS

| | | |
|---|---|---|
| DE | 102014204827 | 9/2014 |
| DE | 102014204830 | 9/2014 |
| DE | 102014204834 | 9/2014 |
| DE | 102014213036 | 1/2015 |
| EP | 1647908 | 4/2006 |
| EP | 2487610 | 8/2012 |
| EP | 2778913 | 9/2014 |
| EP | 2778914 | 9/2014 |
| EP | 2911078 | 8/2015 |
| GB | 2366498 | 3/2002 |
| GB | 2513472 | 10/2014 |
| GB | 2513721 | 11/2014 |
| GB | 2517582 | 2/2015 |
| NL | 2013134 | 1/2015 |
| WO | WO 2008/113059 | 9/2008 |
| WO | WO 2009/051987 | 4/2009 |
| WO | WO 2010/030919 | 3/2010 |
| WO | WO2011/161565 | 12/2011 |
| WO | WO2012/009397 | 1/2012 |
| WO | WO 2012/061162 | 5/2012 |

OTHER PUBLICATIONS

U.S. Appl. No. 12/556,307, filed Sep. 9, 2009, Office Action, dated Jun. 9, 2015.
U.S. Appl. No. 14/571,098, filed Dec. 15, 2014, First Office Action Interview, dated Mar. 11, 2015.
U.S. Appl. No. 14/552,336, filed Nov. 24, 2014, First Office Action Interview, dated Jul. 20, 2015.
U.S. Appl. No. 14/304,741, filed Jun. 13, 2014, Final Office Action, dated Mar. 3, 2015.

(56) References Cited

OTHER PUBLICATIONS

U.S. Appl. No. 13/827,491, filed Mar. 14, 2013, Office Action, dated Dec. 1, 2014.
U.S. Appl. No. 13/827,491, filed Mar. 14, 2013, Final Office Action, dated Jun. 22, 2015.
U.S. Appl. No. 14/571,098, filed Dec. 15, 2014, First Office Action Interview, dated Aug. 5, 2015.
U.S. Appl. No. 14/571,098, filed Dec. 15, 2014, First Office Action Interview, dated Nov. 10, 2015.
U.S. Appl. No. 14/571,098, filed Dec. 15, 2014, First Office Action Interview, dated Aug. 24, 2015.
U.S. Appl. No. 13/827,491, filed Mar. 14, 2013, Office Action, dated Oct. 9, 2015.
U.S. Appl. No. 14/800,447, filed Jul. 15, 2012, First Office Action Interview, dated Dec. 10, 2010.
U.S. Appl. No. 12/556,307, filed Sep. 9, 2009, Notice of Allowance, dated Jan. 4, 2016.
U.S. Appl. No. 12/556,307, filed Sep. 9, 2009, Office Action, dated Sep. 2, 2011.
U.S. Appl. No. 12/556,307, filed Sep. 9, 2009, Final Office Action, dated Feb. 13, 2012.
U.S. Appl. No. 12/556,307, filed Sep. 9, 2009, Office Action, dated Oct. 1, 2013.
U.S. Appl. No. 12/556,307, filed Sep. 9, 2009, Final Office Action, dated Mar. 14, 2014.
U.S. Appl. No. 12/556,307, filed Sep. 9, 2009, Notice of Allowance, dated Mar. 21, 2016.
U.S. Appl. No. 14/014,313, filed Aug. 29, 2013, First Office Action Interview, dated Jun. 18, 2015.
U.S. Appl. No. 14/014,313, filed Aug. 29, 2013, Final Office Action, dated Feb. 26, 2016.
U.S. Appl. No. 14/571,098, filed Dec. 15, 2014, Final Office Action, dated Feb. 23, 2016.
U.S. Appl. No. 14/800,447, filed Jul. 15, 2012, Interview Summary, dated Mar. 3, 2016.
U.S. Appl. No. 13/827,491, filed Mar. 14, 2013, Office Action, dated Mar. 30, 2016.
U.S. Appl. No. 14/526,066, filed Oct. 28, 2014, Office Action, dated Jan. 21, 2016.
U.S. Appl. No. 14/304,741, filed Jun. 13, 2014, Notice of Allowance, dated Apr. 7, 2015.
U.S. Appl. No. 14/304,741, filed Jun. 13, 2014, Office Action Pre Interview, dated Aug. 6, 2014.
U.S. Appl. No. 14/094,418, filed Dec. 2, 2013, Notice of Allowance, dated Jan. 25, 2016.
U.S. Appl. No. 14/868,310, filed Sep. 28, 2015, Office Action, dated Dec. 16, 2016.
U.S. Appl. No. 14/334,232, filed Jul. 17, 2014, Notice of Allowance, dated Nov. 10, 2015.
U.S. Appl. No. 13/657,684, filed Oct. 22, 2012, Notice of Allowance, dated Mar. 2, 2015.
U.S. Appl. No. 14/286,485, filed May 23, 2014, Notice of Allowance, dated Jul. 29, 2015.
U.S. Appl. No. 14/076,385, filed Nov. 11, 2013, Office Action, dated Jun. 2, 2015.
U.S. Appl. No. 14/076,385, filed Nov. 11, 2013, Final Office Action, dated Jan. 25, 2016.
U.S. Appl. No. 14/076,385, filed Nov. 11, 2013, Final Office Action, dated Jan. 22, 2015.
U.S. Appl. No. 14/286,485, filed May 23, 2014, Pre-Interview Communication, dated Mar. 12, 2015.
U.S. Appl. No. 14/286,485, filed May 23, 2014, First Office Action Interview, dated Apr. 30, 2015.
U.S. Appl. No. 14/473,860, filed Aug. 29, 2014, Notice of Allowance, dated Jan. 5, 2015.
U.S. Appl. No. 14/518,757, filed Oct. 20, 2014, Final Office Action, dated Jul. 20, 2015.
U.S. Appl. No. 14/518,757, filed Oct. 20, 2014, First Office Action Interview, dated Apr. 2, 2015.
U.S. Appl. No. 14/518,757, filed Oct. 20, 2014, Office Action, dated Dec. 1, 2015.
U.S. Appl. No. 14/334,232, filed Jul. 17, 2015, Office Action, dated Jul. 10, 2015.
U.S. Appl. No. 156,208, filed Jan. 15, 2014, Final Office Action, dated Aug. 11, 2015.
U.S. Appl. No. 14/156,208, filed Jan. 15, 2014, Interview Summary, dated Sep. 17, 2015.
U.S. Appl. No. 14/156,208, filed Jan. 15, 2014, Notice of Allowance, dated Feb. 12, 2016.
U.S. Appl. No. 14/156,208, filed Jan. 15, 2014, Office Action, dated Mar. 9, 2015.
U.S. Appl. No. 13/076,804, filed Mar. 31, 2011, Advisory Action, dated Jun. 20, 2013.
U.S. Appl. No. 12/836,801, filed Jul. 15, 2010, Notice of Allowance, dated Apr. 16, 2013.
U.S. Appl. No. 13/076,804, filed Mar. 31, 2011, Notice of Allowance, dated Aug. 26, 2013.
U.S. Appl. No. 13/355,726, filed Jan. 23, 2012, Notice of Allowance, dated Apr. 28, 2014.
U.S. Appl. No. 14/830,420, filed Aug. 19, 2015, Office Action, dated Jul. 12, 2016.
U.S. Appl. No. 15/143,780, filed May 2, 2016, Final Office Action, dated Jan. 10, 2017.
U.S. Appl. No. 14/842,770, filed Sep. 1, 2015, Office Action, dated Jun. 22, 2017.
U.S. Appl. No. 13/922,437, filed Jun. 20, 2013, Office Action, dated Oct. 25, 2013.
U.S. Appl. No. 13/922,437, filed Jun. 20, 2013, Notice of Allowance, dated May 8, 2014.
U.S. Appl. No. 13/706,804, filed Mar. 31, 2011, Final Office Action, dated Apr. 12, 2013.
U.S. Appl. No. 13/076,804, filed Mar. 31, 2011, Office Action, dated Jan. 4, 2013.
U.S. Appl. No. 14/537,367, filed Nov. 10, 2014, Notice of Allowance, dated Jun. 5, 2017.
U.S. Appl. No. 15/143,780, filed May 2, 2016, Office Action, dated Jul. 17, 2017.
U.S. Appl. No. 14/537,367, filed Nov. 10, 2014, Office Action, dated Feb. 27, 2017.
U.S. Appl. No. 13/922,437, filed Jun. 20, 2013, Notice of Allowance, dated Jul. 3, 2014.
U.S. Appl. No. 13/355,726, filed Jan. 23, 2012, Office Action, dated Mar. 25, 2014.
U.S. Appl. No. 12/836,801, filed Jul. 15, 2010, Office Action, dated Sep. 6, 2012.
U.S. Appl. No. 13/657,684, filed Oct. 22, 2012, Office Action, dated Aug. 28, 2014.
U.S. Appl. No. 14/830,420, filed Aug. 19, 2015, Office Action, dated Jan. 23, 2017.
"A Tour of Pinboard," <http://pinboard.in/tour> as printed May 15, 2014 in 6 pages.
"E-Mail Relay," <http://web.archive.org/web/20080821175021/http://emailrelay.sourceforge.net/> Aug. 21, 2008, pp. 2.
Anonymous, "A Real-World Problem of Matching Records," Nov. 2006, <http://grupoweb.upf.es/bd-web/slides/ullman.pdf> pp. 1-16.
Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.
Chaudhuri et al., "An Overview of Business Intelligence Technology," Communications of the ACM, Aug. 2011, vol. 54, No. 8.
Delicious, <http://delicious.com/> as printed May 15, 2014 in 1 page.
Dell Latitude D600 2003, Dell Inc., http://www.dell.com/downloads/global/products/latit/en/spec_latit_d600_en.pdf.
Dou et al., "Ontology Translaation on the Semantic Web 2005," Springer-Verlag, Journal on Data Semantics II Lecture Notes in Computer Science, vol. 3350, pp. 35-37.
European Search Report for European Patent Application No. 09812700.3 dated Apr. 3, 2014.

(56) References Cited

OTHER PUBLICATIONS

Fidge, Colin J., "Timestamps in Message-Passing Systems," K. Raymond (Ed.) Proc. of the 11th Australian Computer Science Conference (ACSC 1988), pp. 56-66.
Gill et al., "Computerised Linking of Medical Records: Methodological Guidelines,".
Gu et al., "Record Linkage: Current Practice and Future Directions," Jan. 15, 2004, pp. 32.
Hua et al., "A Multi-attribute Data Structure with Parallel Bloom Filters for Network Services", HiPC 2006, LNCS 4297, pp. 277-288, 2006.
Johnson, Maggie, "Introduction to YACC and Bison".
Johnson, Steve, "Access 2013 on demand," Access 2013 on Demand, May 9, 2013, Que Publishing.
Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Mattern, F., "Virtual Time and Global States of Distributed Systems," Cosnard, M., Proc. Workshop on Parallel and Distributed Algorithms, Chateau de Bonas, France:Elsevier, 1989, pp. 215-226.
Nadeau et al., "A Survey of Named Entity Recognition and Classification," Jan. 15, 2004, pp. 20.
Nin et al., "On the Use of Semantic Blocking Techniques for Data Cleansing and Integration," 11th International Database Engineering and Applications Symposium, 2007, pp. 9.
Notice of Acceptance for Australian Patent Application No. 2014203669 dated Jan. 21, 2016.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014203669 dated May 29, 2015.
Official Communication for Canadian Patent Application No. 2806954 dated Jan. 15, 2016.
Official Communication for European Patent Application No. 10188239.7 dated Mar. 24, 2016.
Official Communication for European Patent Application No. 14158958.0 dated Mar. 11, 2016.
Official Communication for European Patent Application No. 14158958.0 dated Apr. 16, 2015.
Official Communication for European Patent Application No. 14158958.0 dated Jun. 3, 2014.
Official Communication for European Patent Application No. 14158977.0 dated Jun. 10, 2014.
Official Communication for European Patent Application No. 14158977.0 dated Mar. 11, 2016.
Official Communication for European Patent Application No. 14158977.0 dated Apr. 16, 2015.
Official Communication for European Patent Application No. 14159175.0 dated Feb. 4, 2016.
Official Communication for European Patent Application No. 15155845.9 dated Oct. 6, 2015.
Official Communication for European Patent Application No. 15156004.2 dated Aug. 24, 2015.
Official Communication for European Patent Application No. 15200073.3 dated Mar. 30, 2016.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1411984.6 dated Dec. 22, 2014.
Official Communication for Great Britain Patent Application No. 1411984.6 dated Jan. 8, 2016.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for Netherlands Patent Application No. 2013134 dated Apr. 20, 2015.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 628161 dated Aug. 25, 2014.
Pythagoras Communications Ltd., "Microsoft CRM Duplicate Detection," Sep. 13, 2011, https://www.youtube.com/watch?v=j-7Qis0D0Kc.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14.
Sekine et al., "Definition, Dictionaries and Tagger for Extended Named Entity Hierarchy," May 2004, pp. 1977-1980.
Symantec Corporation, "E-Security Begins with Sound Security Policies," Announcement Symantec, Jun. 14, 2001.
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
Canadian Claims in application No. 2,851,904, dated Apr. 2017, 4 pages.
Canadian Intellectual Property Office, "Search Report" in application No. 2,851,904, dated Apr. 27, 2017, 4 pages.
Palermo, Christopher J., "Memorandum," [Disclosure relating to U.S. Appl. No. 13/916,447, filed Jun. 12, 2013, and related applications], Jan. 31, 2014 in 3 pages.
Official Communication for Australian Patent Application No. 2012238282 dated Jun. 6, 2014.
Saito et al., "Optimistic Replication," Technical Report, Sep. 2003, 52 pages.
OWL Web Ontology Language Reference Feb 04, W3C, http://www.w3.org/TR/owl-ref/.
Official Communication for Australian Patent Application No. 2012238282 dated Jan. 30, 2014.
Official Communication for Canadian Patent Application No. 2,666,364 dated Oct. 3, 2013.
International Search Report & Written Opinion for PCT/US2011/043794 dated Feb. 24, 2012.

(56) References Cited

OTHER PUBLICATIONS

Official Communication for European Patent Application No. 13152370.6 dated Jun. 3, 2013.
Official Communication for European Patent Application No. 11807426.9 dated Nov. 15, 2016.
Sommers, "Round-Trip Translation: What Is It Good For?" date unknown, captured by archive.org on Sep. 24, 2006, co.umist.ac.uk, https://web.archive.org/web/20060701000000*/http://www.co.umist.ac.uk/~harold/RoundTrip.doc.
Pat, date unknown, captured from Google Cache on Jul. 6, 2017, sheknows.com, http://webcache.googleusercontent.com/search?1-cache:FQ6muzEa9W0J:www.sheknows.com/baby-names/name/pat+&cd=13&hl=en&ct=cink&gl=us.
Bittlingmayer, A.M. "How Good is a Round-trip Translation as a Machine Translation Quality Evaluation Technique?" Comment Mar. 16, 2014, stackexchange.com, https://linguistics.stackexchange.com/questions/16994/how-good-is-a-round-trip-translation-as-a-machine-translation-quality-evaluation.
Holliday, JoAnne, "Replicated Database Recovery using Multicast Communication," IEEE 2002, pp. 11.
Lamport, "Time, Clocks and the Ordering of Events in a Distributed System," Communications of the ACM, Jul. 1978, vol. 21, No. 7, pp. 558-565.
Loeliger, Jon, "Version Control with Git," O'Reilly, May 2009, pp. 330.
O'Sullivan, Bryan, "Making Sense of Revision Control Systems," Communications of the ACM, Sep. 2009, vol. 52, No. 9, pp. 57-62.
Parker, Jr. et al., "Detection of Mutual Inconsistency in Distributed Systems," IEEE Transactions in Software Engineering, May 1983, vol. SE-9, No. 3, pp. 241-247.
Official Communication for New Zealand Patent Application No. 627962 dated Aug. 5, 2014.
Official Communication for New Zealand Patent Application No. 140627NZ/BP dated May 4, 2014.
Official Communication for Canadian Patent Application No. 2666364 dated Jun. 4, 2012.

\* cited by examiner

| operation | obj_comp_id | obj_id | logical_clk | deleted | <values> |
|---|---|---|---|---|---|
| Create | 10 | 10 | 1 | 0 | Type:Person |
| Create | 101 | 10 | 1 | 0 | Name: John Smith |
| Create | 102 | 10 | 2 | 0 | Phone#: 415-222-1234 |
| Edit | 101 | 10 | 3 | 0 | Name: Jonathan Smith |
| Delete | 102 | 10 | 4 | 1 | Phone#: 415-222-1234 |

FIG. 4

SYSTEM AND METHOD FOR INCREMENTAL REPLICATION

RELATED APPLICATIONS

This application claims the benefit as a Continuation of application Ser. No. 14/537,367, entitled "System And Method For Incremental Replication" filed Nov. 10, 2014 with claims the benefit of Continuation of application Ser. No. 13/922,437, entitled "System And Method For Incrementally Replicating Investigative Analysis Data," issued as U.S. Pat. No. 8,886,601 on Nov. 11, 2014, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

A system and method are disclosed which generally relate to replication of database data, and more particularly to a system and method of incrementally replicating database data.

BACKGROUND

Making investigative decisions, especially those that have the potentially to impact lives and communities, requires access to up-to-date and accurate investigative information. Unfortunately, investigative information is often spread across multiple databases, computers, geographies, and clearance levels. For investigative organizations such as intelligence, defense, and law enforcement organizations to be successful, they need ways to share and find information quickly so that critical decisions can be made in time for them to have impact.

One complication to sharing investigative data between investigative teams is that some of teams may be located in geographic locations where network connectivity is unreliable or impractical. For example, a forward deployed military unit may have only periodic access to a satellite-based network. Thus, solutions for sharing data that presume highly-available network connectivity may be inadequate or inefficient.

Currently, there exist commercial software products for replicating database data between distributed database instances. These software products, for example, allow an administrator to export database data from a first database instance, copy the exported database data to a second database instance, and once copied, import the exported database data into the second database instance. This process of replicating database data can be tedious, time-consuming, or unreliable, especially when the data network connecting the first and second instances is unreliable and the amount of exported database data is large.

SUMMARY

The following is a summary of various aspects realizable according to various embodiments of the system and method of incrementally replicating investigative analysis data according to the present disclosure. It is provided as an introduction to assist those skilled in the art to more rapidly assimilate the details of the disclosure and does not and is not intended in any way to limit the scope of the claims that are appended hereto.

In one aspect, a method of incrementally replicating investigative analysis data is disclosed along with a system for performing the same. The method and system provide the ability to break a data replication job into multiple "replication chunks" which can be exported and imported separately. By doing so, the method and system can efficiently replicate large numbers of data object changes over an unreliable data network.

BRIEF DESCRIPTION OF THE DRAWINGS

By way of example, reference will now be made to the accompanying drawings.

FIG. 4 illustrates a table of a revisioning database.

DETAILED DESCRIPTION

Figure 1:
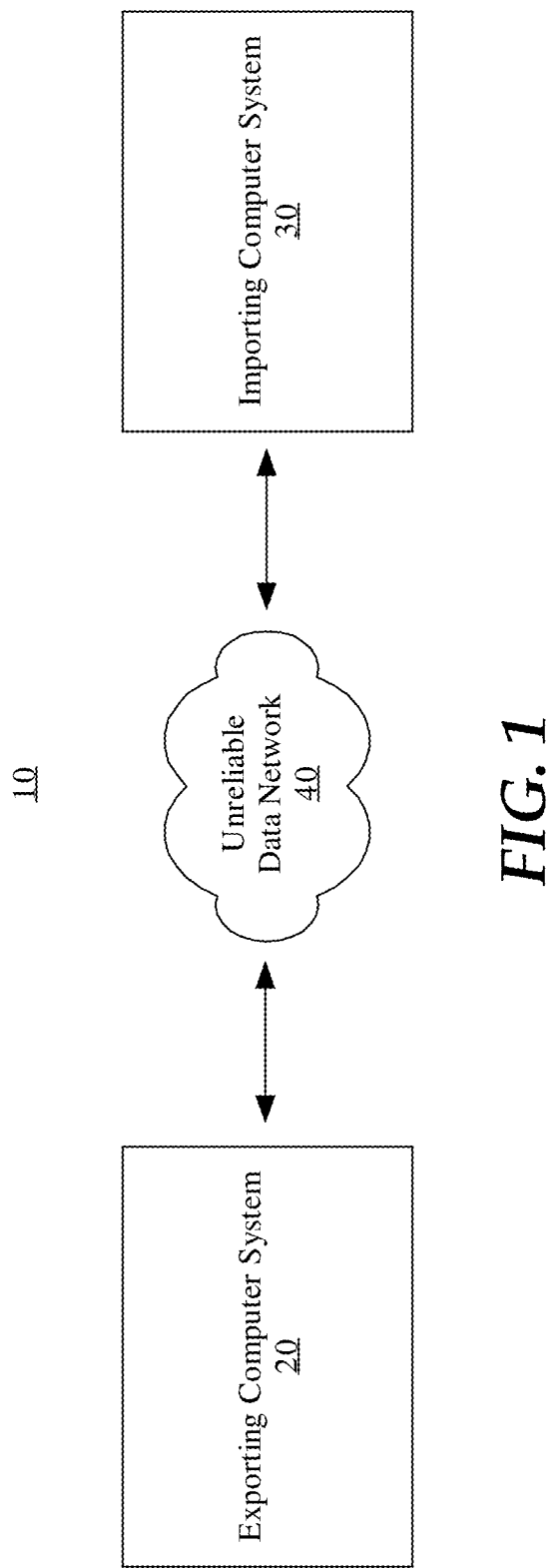
FIG. 1 is a block diagram illustrating a distributed computer system for incrementally replicating investigative analysis data.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention

Overview

A system and method of incrementally replicating investigative analysis data is disclosed herein. In one embodiment, the term "investigative analysis data" generally refers to any database data meaningful to an investigative organization. Investigative analysis data includes, but is not limited to, database data that represents people, places, things, events, documents, media, notes, properties, taken alone and in any combination thereof.

In one embodiment, a method and system are disclosed for incrementally replicating investigative analysis data from an exporting investigative analysis system ("exporting system") to an importing investigative analysis system ("importing system"). The exporting system and the importing system may be operatively coupled by an unreliable data network such as a data network with high latency, low bandwidth, and/or intermittent or periodic availability.

In some embodiments, the exporting system receives a user command to establish an incremental data replication relationship with the importing system and responds by creating an incremental data replication plan. The plan represents an incremental data replication job that is to be performed by the exporting system to replicate, to the importing system, changes to investigative data objects that the exporting system knows about that the exporting system determines the importing system does not yet know about. The number of changes to replicate may be large (e.g., on the order of hundreds of millions). For example, it may have been some time since a last replication exchange between exporting system and the importing system during which a large number of data objects changes were made by the exporting system. Among other information, the plan specifies the number of replication chunks that the incremental replication job is broken down into. After the plan is created, the exporting system separately exports each replication chunk to the importing system according to a user-configurable exportation schedule. For example, the exportation schedule can be configured to accommodate periodic data network availability or to avoid exporting replication chunks during peak usage times of the exporting or importing systems. Depending on the exportation schedule and the number of replication chunks, performance of the incremental replication job can span minutes, hours, days, or longer. During performance of the incremental replication job, the exporting system can continue to make changes to data objects. This is facilitated by an always increasing logical clock maintained at the exporting system that provides a total ordering for all data object changes made by the exporting system. When creating the incremental replication plan, the exporting system records a current logic clock value in the plan. The recorded value represents the most recent data object change that will be included in a replication chunk of the replication job ("maximum export logical clock value"). When exporting replication chunks of the replication job, the exporting system includes only data object changes associated with logic clock values that are less than or equal to the maximum export logical clock value. By doing so, the exporting system provides a consistent "snapshot" view of data object changes to the importing system in the replication chunks. At the same time, the exporting system can make additional data object changes without affecting this consistent view. Such additional data object changes can be replicated to the importing system in a subsequent replication job.

Investigative Analysis Computer System

FIG. 1 illustrates a system for incrementally replicating investigative analysis data. A distributed investigative analysis computer system 10 includes an exporting investigative analysis computer system ("exporting system") 12 and an importing investigative analysis computer system ("importing system") 14. In replication examples described below, investigative analysis data is exported by investigative analysis computer system 12 and imported by investigative analysis computer system 14. Hence, investigative analysis computer system 12 is labeled the "exporting system" and investigative analysis computer system 14 is labeled the "importing system". However, the examples could just have easily involved investigative analysis data exported by investigative analysis computer system 14 and imported by investigative analysis computer system 12. Further, investigative analysis computer system 12 can also function as an importing system and investigative analysis computer system 14 can also function as an exporting system. Thus, investigative analysis computer system 12 can import investigative analysis data as well as export investigative analysis data. Similarly, investigative analysis computer system 14 can export investigative analysis data as well import investigative analysis data.

In distributed investigative analysis system 10, exporting system 12 and importing system 14 may be operatively coupled to each other by unreliable data network 16. Data network 16 may be unreliable in the sense that it is only periodically or intermittently available (i.e., not highly-available), has high network communication latency, and/or has low network communication bandwidth. For example, data network 16 may be unreliable in that a user would find it frustrating or impractical to use for purposes of surfing the Internet.

Figure 2:
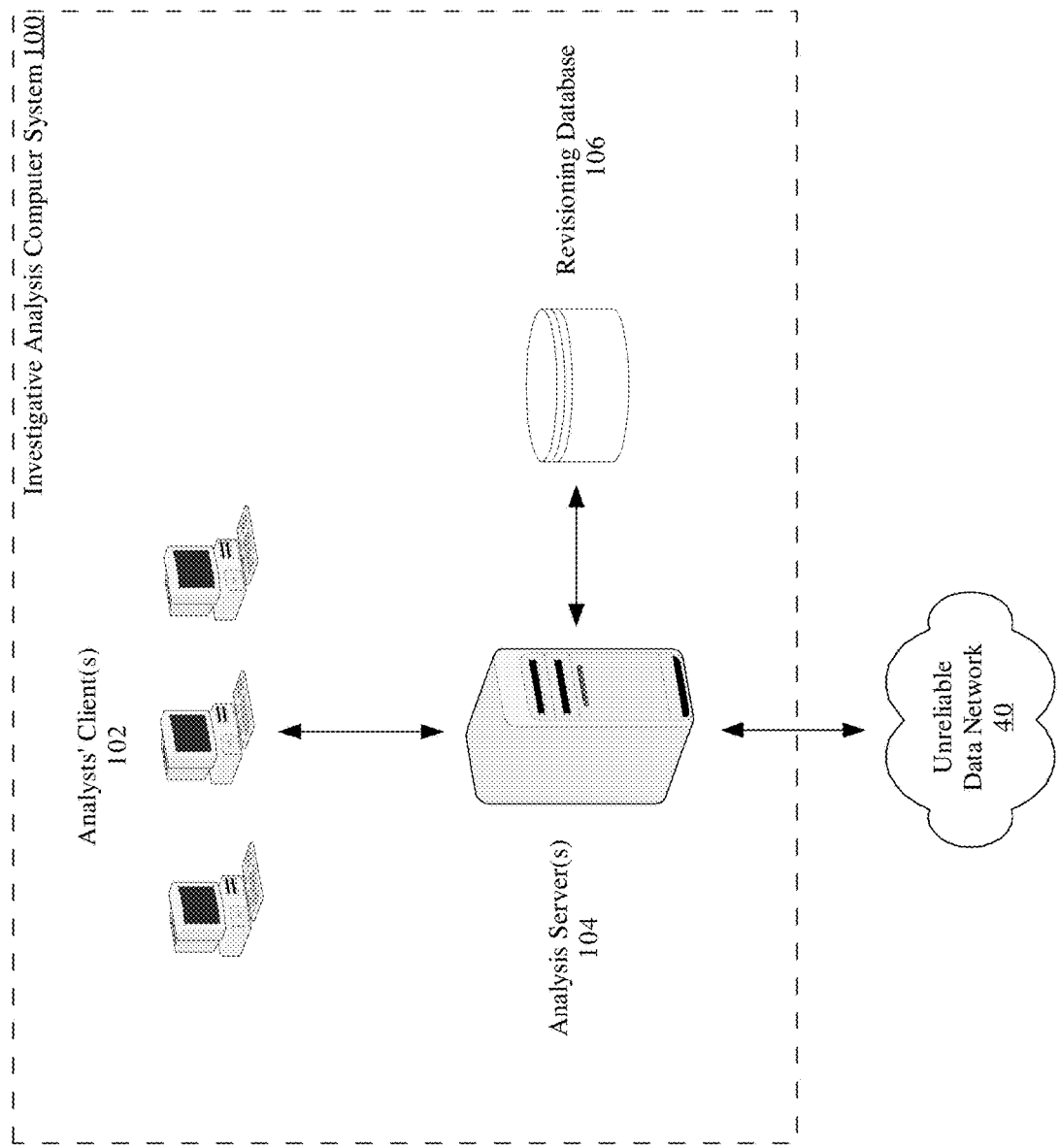
FIG. 2 is a block diagram illustrating an investigative analysis computer system.

FIG. 2 illustrates an investigative analysis computer system 100 which may be used as exporting system 12 and importing system 14 in distributed investigative analysis computer system 10. That is, an instance of investigative analysis computer system 100 may be used as exporting system 12 and another separate instance of investigative analysis computer system 100 may be used as importing system 14. Both instances may be operatively coupled to each other by unreliable data network 16.

Investigative analysis computer system 100 includes one or more analyst clients 102, one or more analysis servers 104, and a revisioning database 106. Clients 102 connect to analysis servers 104 to conduct various investigative analysis and management operations on investigative analysis data stored in revisioning database 106. Investigative analysis operations include commanding analysis servers 104 to create, read, update, and delete investigative analysis data stored in revisioning database 106. Management operations include configuring analysis servers 104 for incremental data replication as described in hereinafter.

In some embodiments, investigative analysis and management operations are conducted by users of clients 102 through a graphical user interface (GUI) or web browser-based user interface presented at clients 102. Such presentation may be driven by analysis servers 104, for example, through delivery of user interface and investigative analysis data according to standardized networking protocols and presentation formats such as the HyperText Transfer Protocol (HTTP), the Secure HyperText Transfer Protocol (HTTPS), the HyperText Markup Language (HTML), Cascading Style Sheets (CSS), JavaScript, etc. In other embodiments, operations are conducted by users through a command line interface (CLI) available at clients 102 or on servers 104.

In one embodiment, the system 100 is embodied in a single computing device such as a laptop computer. In another embodiment, the system 100 is embodied in multiple computing devices such as one or more personal or workstation computing devices for the analysts' clients 102, one or more server computing devices for the analysis servers 104, and one or more server computing devices for the revisioning database 106. In some embodiments, one of the exporting system 12 or the importing system 14 is embodied in a single computing device such as a laptop computer and the other is embodied in multiple computing devices. This embodiment may represent a situation in which, for example, investigative analysis data is being shared between a team of analysts at a hub location such as a central office within the organization and an analyst, or team of analysts, in the field such as at a forward operating location.

Object-Centric Data Model

Figure 3:
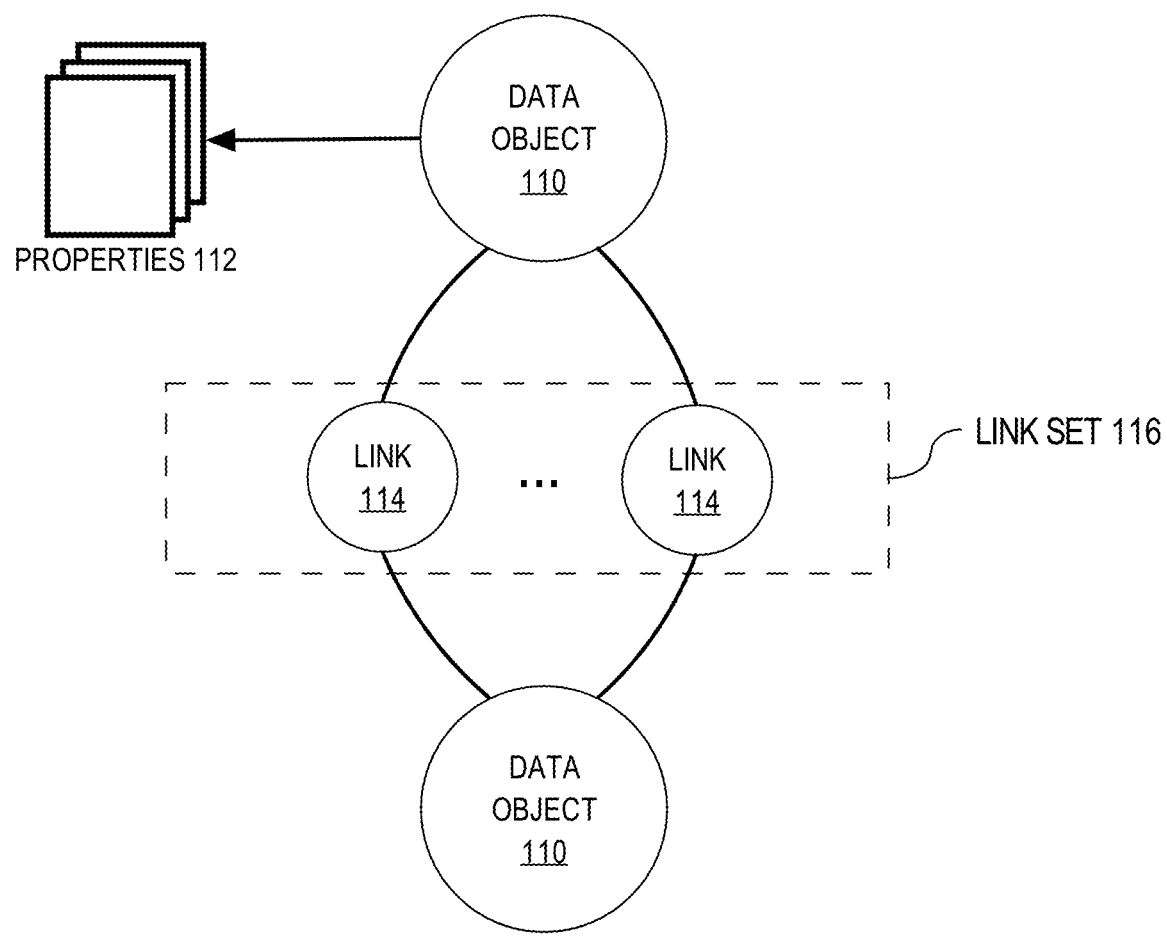
FIG. 3 illustrates an object-centric data model.

Investigative analysis data stored in revisioning database 106 may be conceptually stored and organized according to an object-centric data model. FIG. 3 illustrates an object-centric conceptual data model 108. Model 108 is centered on the notion of a data object 110. At the highest level of abstraction, a data object 110 is a container for information representing things in the world. For example, a data object 110 can represent an entity such as a person, a place, an organization, or other noun. A data object 110 can represent an event that happens at a point in time or for a period of time. A data object 110 can represent a document or other unstructured data source such as an e-mail message, a news report, or a written paper or article. These are just some example of what a data object 110 can represent. A data object 110 may be associated with a unique identifier that uniquely identifies the data object to the investigative analysis computer system 100 among other data objects 110. A data object 110 may also have a type (e.g., Person, Event, or Document) and a display name which may be the value of a particular property of the data object 110.

A data object 110 may have one or more properties 112. A property 112 is an attribute of a data object 110 that represents an individual data item. A property 112 may have a type and a value. Different types of data objects 110 may have different types of properties 112. For example, a Person data object 110 might have an Eye Color property and an Event data object 110 might have a Date property. In one embodiment, the set of data object types and the set of property types for each type of data object supported by the investigative analysis system 100 are defined according to a pre-defined, user-defined, or dynamically-defined ontology or other hierarchical structuring of knowledge through sub-categorization of object types and property types according to their relevant and/or cognitive qualities. In addition, data model 108 may support property multiplicity. In particular, a data object 110 may be allowed to have more than one property 112 of the same type. For example, a Person data object might have multiple Address properties or multiple Name properties.

A link 114 represents a connection between two data objects 110. In one embodiment, the connection is either through a relationship, an event, or through matching properties. A relationship connection may be asymmetrical or symmetrical. For example, Person data object A may be connected to Person data object B by a Child Of relationship (where Person data object B has an asymmetric Parent Of relationship to Person data object A), a Kin Of symmetric relationship to Person data object C, and an asymmetric Member Of relationship to Organization data object X. The type of relationship between two data objects may vary depending on the types of the data objects. For example, Person data object A may have an Appear In relationship with Document data object Y or have a Participate In relationship with Event data object E. As an example of an event connection, two Person data objects may be connected by an Airline Flight data object representing a particular airline flight if they traveled together on that flight, or by a Meeting data object representing a particular meeting if they both attended that meeting. In one embodiment, when two data objects are connected by an event, they are also connected by relationships, in which each object has a specific relationship to the event, such as, for example, an Appears In relationship. As an example of a matching properties connection, two Person data objects representing a brother and a sister, may both have an Address property that indicates where they live. If the brother and the sister live in the same home, then their Address properties likely contain similar, if not identical information. In one embodiment, a link 114 between two data objects may be established based on similar or matching properties of the data objects. The above are just some examples of the types of connections that may be represented by a link 114 and other types of connections may be represented. Thus, it should be understood that embodiments of the invention are not limited to any particular types of connections between data objects 110. For example, a document might contain two different tagged entities. A link 114 between two data objects 110 may represent a connection between these two entities through their co-occurrence within the same document.

A data object 110 can have multiple links 114 with another data object 110 to form a link set 116. For example, two Person data objects representing a husband and a wife could be linked through a Spouse Of relationship, a matching property (Address), and an event (Wedding).

Revisioning Database

Investigative analysis computer system 100 employs a revisioning database system for tracking changes made to investigative analysis data stored in revisioning database 106. In some embodiments, the revisioning database system is implemented by analysis servers 104 as an application on top of a conventional database management system (not shown). For example, the database management system may be a relational database management system such as those commercially available from the Oracle Corporation of Redwood Shores, Calif. and the Microsoft Corporation of Redmond, Wash.

In one aspect, the revisioning database system differs from other types of database systems in that the revisioning database system is capable of answering a query about the state of investigative analysis data stored in revisioning database 106 at a point in time in the past as opposed to only being able to answer a query about the current state of the investigative analysis data. With the revisioning database system, investigative analysts can determine when a particular piece of data was added or edited in revisioning database 106. Thus, the revisioning database system, as a result of its capability to track changes to investigative analysis data stored in the revisioning database 106, enables investigative analysts to determine what was known when.

In one embodiment, revisioning database system is capable of tracking all changes made to investigative analysis data over a period of time. To do so, the revisioning database system creates a new database change record in revisioning database 106 for every creation, edit, or deletion of a data object 110, property 112, or link 114, thereby creating a historical record of all changes. To track the ordering of the changes, the revisioning database system employs an always increasing logical clock that models all of the changes as a linear sequence of database events. The logical clock provides a total ordering for all changes. In addition, the logical clock provides atomicity for changes as multiple changes can occur at the same point in the linear sequence of database events represented by the logical clock (and hence be associated with the same logical clock value).

FIG. 4 illustrates tracking changes made to revisioning database 106 by an example and according to an embodiment of the invention. As shown in FIG. 4, each record 118, 120, 122, 124, and 126 in table 128 represents a creation, edit, or deletion of a data object 110 or a creation, edit, or deletion of a property 122 of a data object 110. The fields of each change record include a 'obj_comp_id' field identifying the data object 110 or property 112 that was created, edited, or deleted by the change, an 'obj_id' field identifying the data object 110 that was created, edited, or deleted by the change, a 'logical_clk' field that identifies the order of the change in a total ordering of all changes made to revisioning database 106, a 'deleted' field indicating whether the change was a deletion of a data object 110 or a property 112, and a '<values>' field indicating, for changes that create or edit a value, the value that resulted from the change or, for changes that delete a value, the value that was deleted.

For example, referring to FIG. 4, at logical clock event 1, a data object 110 of type "Person" was created. Also at logical clock event 1, a "Name" property of the data object was created and given the value "John Smith". Later, at logical clock event 2, a "Phone #" property of the object was created and given the value "415-222-1234". At logical clock event 3, the "Name" property of the object that was created at logical clock event 2 was edited with the value "Jonathan Smith". At logical clock event 4, the "Phone #" property that was created at logical clock event 3 was deleted. As a result of the changes at logical clock events 1, 2, and 3, the state of the object at logical clock event 4 is an object 110 of type "Person" with the property "Name" having a value "Jonathan Smith".

By preserving all changes made to an object 110 in the form of change records, the revisioning database system is able to provide the state of an object 110 at a point in time in the past. For example, referring again to FIG. 4, it can be seen from change records 118, 120, and 122 that the state of the object with obj_id=10 at logical clock event 2 was an object 110 of type "Person" with a property "Name" having a value "John Smith" and a property "Phone #" having a value "415-222-1234".

Note that while table 128 contains change records for only one data object with an identifier of 10, table 128 could contain change records for multiple data objects.

FIG. 4 illustrates but one example scheme that the revisioning database system could employ to track changes to revisioning database 106. However, the invention should not be construed as being limited to only the one example scheme or be construed as requiring all details of the one example scheme. For example, instead of storing change records for all data objects in a single table as depicted in FIG. 4, the change records might be stored across multiple tables. Further, the change records may contain other fields that are not depicted in FIG. 4. For example, each change record may have an additional version field that serves as a single primary key for the change record as opposed to using a combination of the 'obj_comp_id' and the 'logical_clk' fields as the primary key.

Process for Incremental Data Replication

Figure 5:
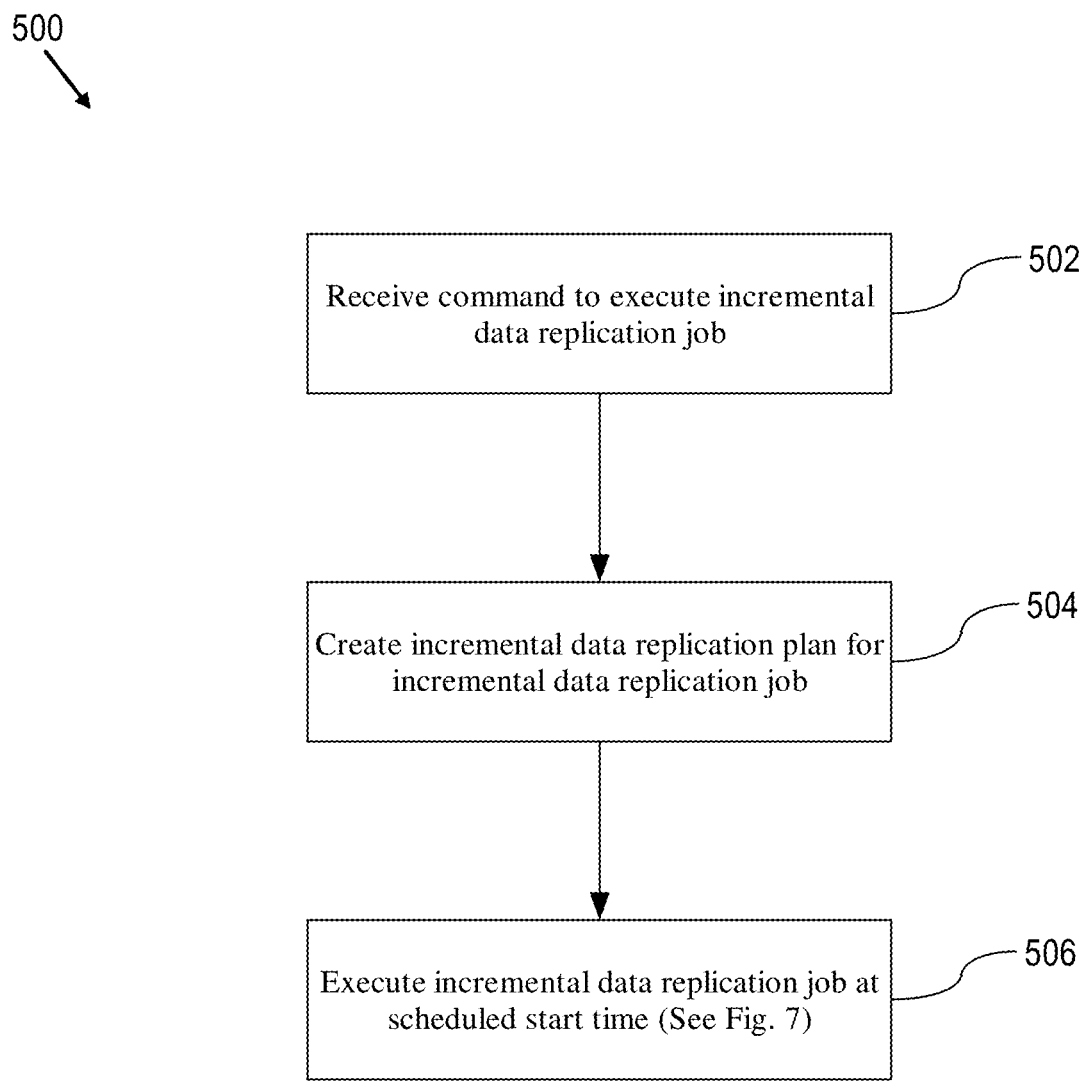
FIG. 5 is a flowchart illustrating a computer-implemented process for incrementally replicating investigative analysis data.

FIG. 5 is a process for incrementally replication investigative data from an exporting system to an importing system. The process may be performed by one or more computing devices. For example, the process may be performed by one or more analysis servers 104 of exporting system 20.

At step 502, the exporting system receives a command from a user to execute an incremental replication job. The command may be provided by the user through a graphical user interface such as a graphical user interface presented at an analyst client 102, for example. Alternatively, the command may be provided by the user through a command line interface at an analyst client 102 or at an analysis server 104, as some examples.

In some embodiments, the command includes a specification of an identifier of the importing system that the exporting system is to export investigative analysis data to. The specification can be any identifier that the exporting system can use to identity the importing system. For example, the identifier can be a network address, domain name, or assigned identifier of the importing system.

In some embodiments, the command includes a specification of a replication chunk size. The specification can be a number that represents the maximum number of replication chunks to divide the incremental data replication job into. Alternatively, the specification can be a number that represents the maximum number of data objects to include change data for in a replication chunk of the incremental data replication job. As yet another possible alternative, the specification can be a maximum number of replication chunks to divide the incremental replication job into. As used herein, the term "change data" refers broadly to data representing a change to a data object. Change data can include the data of the change itself (e.g., the values that were created, edited, or deleted) and any associated metadata. Such metadata may include information representing the version of the change and may include, for example, logical clock values and vector clock information for determining causality of the change with respect to other changes made to the data object at the importing system.

The command may also include a specification of an exportation schedule. The specification may include a start time when the exporting system is to begin execution of the incremental data replication job. For example, the user may specify a start time that is in the middle of the night or other time when the exporting system or the importing system is not being heavily used. As another example, the start time may correspond to when network connectivity between the exporting system and the importing system is expected to be available. For example, if the network connectivity is satellite-based, then the start time may correspond to when the satellite is in range of the exporting system or the importing system.

At step 504, the exporting system creates an incremental data replication plan for the incremental data replication job. The plan may be stored persistently such as in revisioning database 106 or other non-volatile data storage medium so that it is not lost in the event of power failure or other failure of the exporting system. By persistently storing the plan, the exporting system can resume the incremental data replication job from the stored plan after a failure. For example, if some but not all of the chunks were successfully exported or all chunks were successfully exported but not all chunks were successfully received by the importing system, the missing or failed chunks can be exported individually. Accordingly, in some embodiments, a received command to execute an incremental replication job specifies one or more particular chunks to export. The exporting system then exports the specified chunks based on the previously stored plan.

Incremental Data Replication Plan

Figure 6:
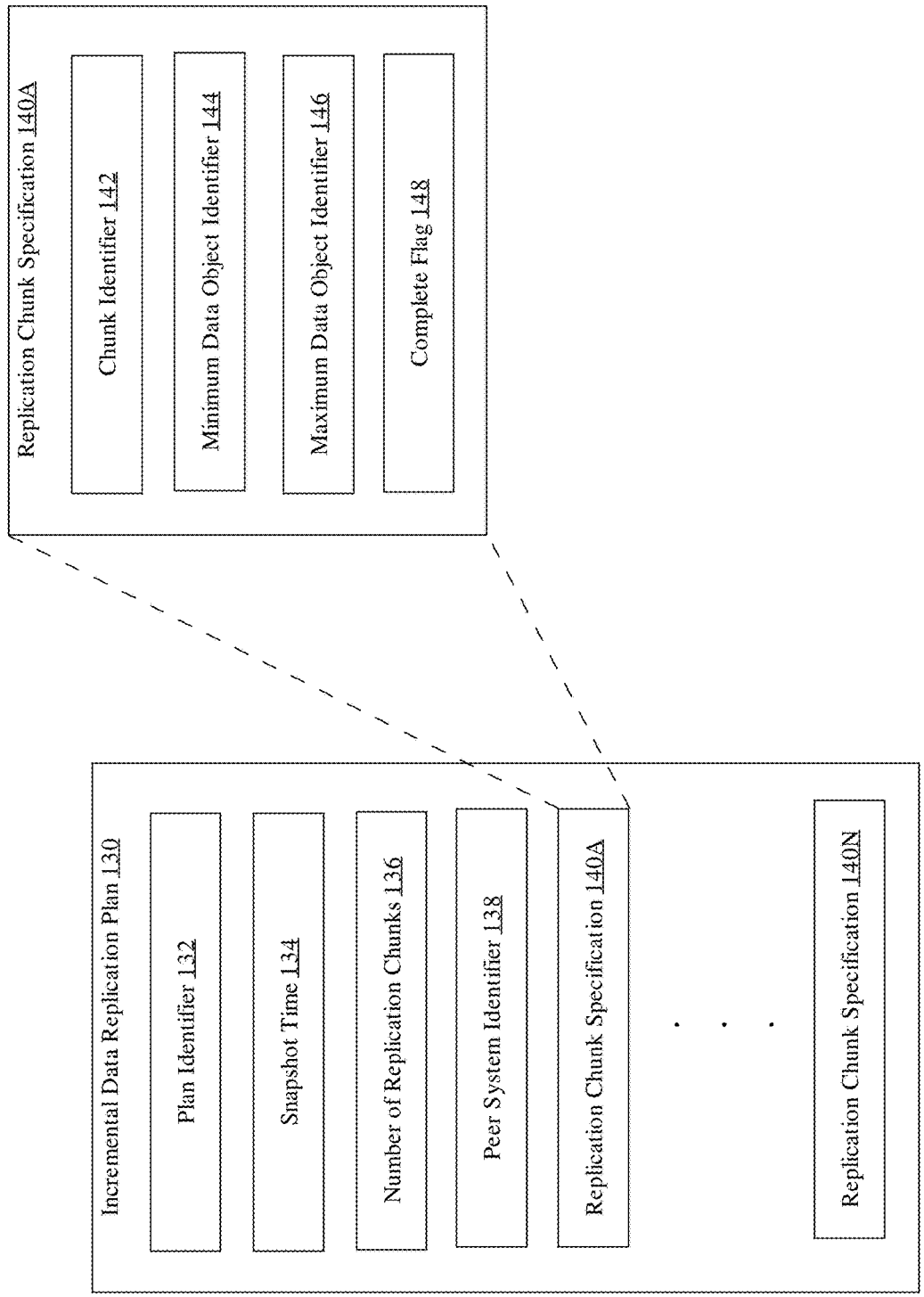
FIG. 6 is a block diagram illustrating an incremental replication plan.

FIG. 6 is a block diagram illustrating an incremental data replication plan according to an embodiment of the present invention. As mentioned, data representing an incremental replication plan may be persistently stored in non-volatile data storage media, for example, as one or more rows in one or more database tables. During job execution, data representing an incremental replication plan may also be stored in volatile computer memory, for example, as one or more data structures or software objects.

As shown, plan 130, representing an incremental data replication job, includes a unique plan identifier 132, a snapshot time 134, the number 136 of replication chunks the job is divided into, an identifier 136 of the importing system, and one or more specifications 138A-N of the replication chunk, one for each of the number 136 of replication chunks.

Plan identifier 132 may be any identifier that the exporting system and importing system can use to refer to or identify the corresponding replication job represented by the plan 130.

Snapshot time 134 is a current logical clock value from exporting system's logical clock used by the exporting system to provide a total ordering of changes to data objects made by the exporting system. Snapshot time 134 may be obtained from the logical clock in response to receiving the command to execute the incremental data replication job for which plan 130 is created. By recording snapshot time 134 in plan 130, ongoing changes can be made to investigative analysis data by the exporting system without affecting which changes will be included in the incremental data replication job.

As mentioned, peer system identifier 138 is an identifier of the importing system that exporting system will be exporting changes to in the incremental replication job represented by plan 130.

As mentioned, the incremental data replication job is divided into the number 136 of replication chunks based on the replication chunk size information specified in the command to execute the job. Plan 130 also includes a replication chunk specification 140 for each of the number 136 of replication chunks. Each replication chunk specification 140 includes a chunk identifier 142, a minimum data object identifier 144, a maximum data object identifier 146, and a complete flag 148.

In some embodiments, the replication chunks of the job represented by plan 130 are ordered. The chunk identifier 142 indicates the order of the corresponding replication chunk. For example, the chunk identifier 142 can be an ordinal number such as 1, 2, 3, etc.

Minimum data object identifier 144 specifies the lowest valued identifier of all data objects for which change data will be included in the corresponding replication chunk. Maximum data object identifier 146 specifies the highest value identifier of all data objects for which change data will be included in the corresponding replication chunk.

Complete flag 148 is used by the exporting system to track if the corresponding replication chunk has been exported. Complete flag 148 is initially set to zero, false, or other similar value. After the corresponding replication chunk has been successfully exported, which may or may not be after the importing system has imported or even received the replication chunk, the exporting system sets the complete flag 148 to one, true, or other similar value.

Return to the process of FIG. 5, at step 506, the exporting system executes the incremental replication job according to the plan created at step 504. The exporting system may start execution at the start time specified in the command received at step 502. If no start time is specified in the command, then the exporting system may start execution of the job immediately or in response to a future triggering of the job. For example, after the plan is created at step 504, a user may interact with a graphical user interface or a command line interface to command the exporting system to start execution of the job. As an alternative to a user interacting with a user interface, a script or cron job may be used to trigger execution of the job at a point in the future after the plan is created at step 504.

Incremental Replication Job Execution

Figure 7:
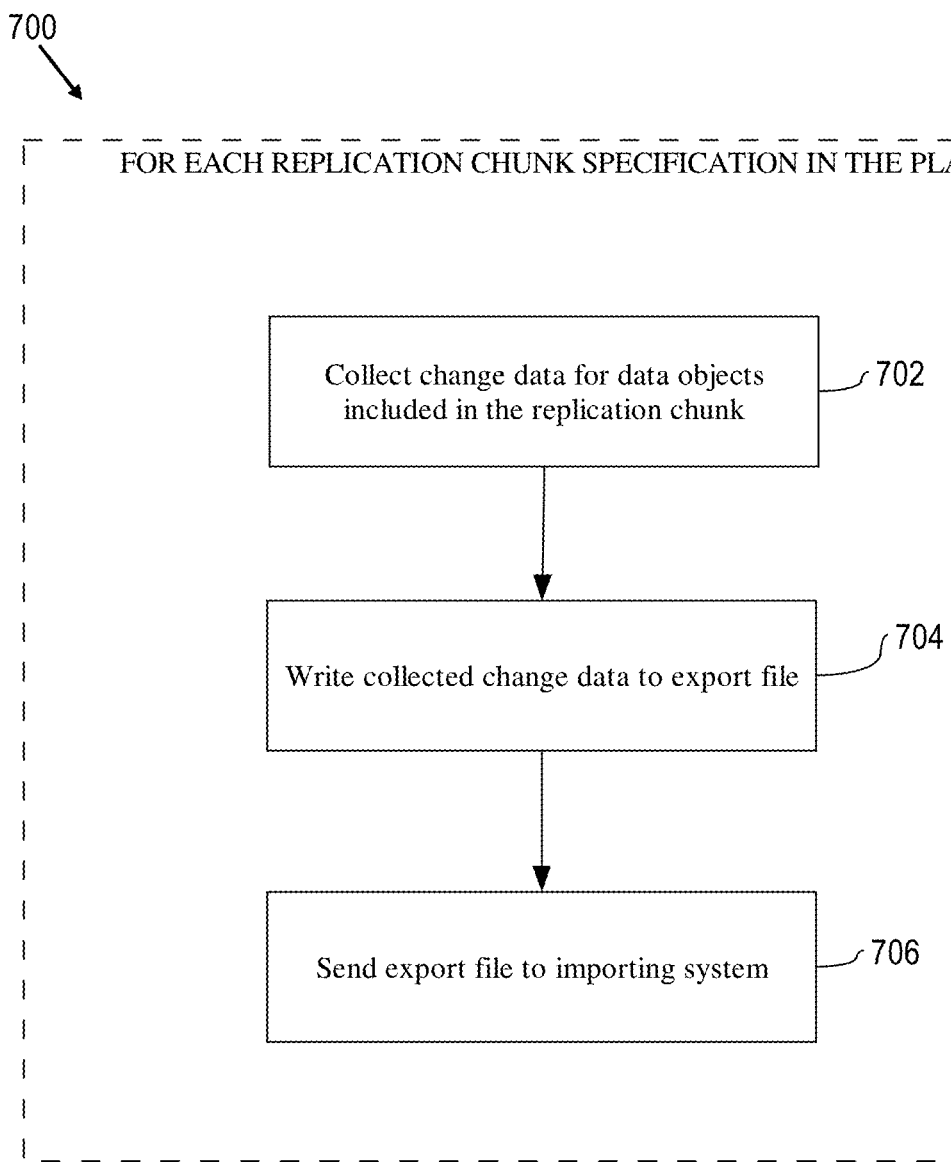
FIG. 7 is a flowchart illustrating a computer-implemented process for executing an incremental replication job.

FIG. 7 is a flow diagram illustrating a process performed by the exporting system for executing an incremental replication job from an incremental replication plan according to an embodiment of the invention. The process illustrated in FIG. 6 may be performed as part of step 506 of the process illustrated in FIG. 5 for performing an incremental data replication. The process illustrated in FIG. 6 may be performed by one or more computing devices. For example, the process illustrated in FIG. 6 may be performed by one or more analysis servers 104 of the exporting system.

As shown steps 702, 704, and 706 are performed for each replication chunk specification in the incremental data replication plan. For example, step 702, 704, and 706 may be performed by the exporting system for each replication chunk specification 140 in a plan 130. Further, steps 702, 704, and 706 are performed for each replication chunk specification in the order of their assigned replication chunk identifiers. For example, steps 702, 704, and 706 may be performed by the exporting system for each replication chunk specification 140 in a plan 130 in order of the respective chunk identifiers 142.

At step 702, change data for the data objects included in the current replication chunk are collected from the revisioning database at the exporting system. Generally, this involves the exporting system reading change records from the revisioning database corresponding to changes to data objects included in the replication chunk that are associated with logical clock values that are less than or equal to the snapshot time recorded in the incremental data replication plan. For example, for the current replication chunk specification 140, exporting system may read all records from table 128 where obj_id is greater than or equal to minimum data object identifier 144 and obj_id is less than or equal to maximum data object identifier 146 and where logical_clk is less than or equal to snapshot time 134. This filter may be further refined to exclude change records that exporting system "knows" the importing system has already received. Such knowledge by exporting system can be based on previous replication exchanges between the exporting system and the importing system. For example, the importing system may provide version vector information and/or acknowledgement vector information to the exporting system in such replication exchanges that indicate the version of investigative analysis data the importing system has in its revisioning database at the time of the exchanges. Note the knowledge the exporting system has about the importing system may be out-of-date at the time the exporting system executes the incremental replication job. This may be because the importing system has received and imported change data from other investigative analysis systems since the last replication exchange between the exporting system and the importing system. In this case, the exporting system may send change data for data object changes in the incremental data replication that the importing system has previously received and considered. In some embodiments, the importing system simply discards the duplicate change data.

In some embodiments, change data collected for inclusion in a replication chunk includes change data for revisioning database entities that depend on multiple data objects depend on that multiple data objects depend on. For example, a link 114 that is changed may depend on two data objects 110. As another example, multiple data objects 110 may depend on a data source. In this context, a data source represents a file, data base, a document, or other source of information that backs one or more data objects 110 and provides a lineage for the source of information that forms one or more data objects 110. In some embodiments, where change data such as for a link depends on change data for one or more data objects to be exported as part of the replication job, the dependent change data is included in same chunk as the chunk that includes the last of the one or more data objects that are depended on. In other embodiments, the dependent change data is included in the last chunk of the replication job. In some embodiments, where change data such as for a data source is depended on by one or more data objects to be exported as part of the replication job, the depended upon change data is included in the same chunk as the chunk that includes the first of the one or more dependent data objects. In other embodiments, the depended upon change data is included in the first chunk of the replication job.

At step 704, the change data collected at step 702 is written to a local file. For example, the file may be one stored on analysis servers 104. As well as the change data, the file may include other incremental replication data such as replication metadata. The replication metadata may include version vector information and access control information. The contents of the file may also be encrypted for security.

At step 706, the exporting system sends the file written to in step 704 to the importing system. The exporting system may send the file to the importing system using any suitable reliable network transport protocol such as the Transmission Control Protocol/Internet Protocol (TCP/IP).

As an alternative to writing the collected change data to a local file (step 704) and then sending the file (step 706) to the importing system, the exporting system can stream the change data and associated replication metadata to the importing system over the network as it is collected without first writing the change data and associated replication metadata to a local file.

In some embodiments, the exporting system includes a "local ack" vector clock as part of the replication metadata included in the last (highest ordered) replication chunk exported as part of the job. In the parlance of causality in distributed systems, the local ack vector clock "happens after" all data object changes in all replication chunks of the job. The lock ack vector clock indicates to the importing system that once the importing system has imported all replication chunks in their specified order the importing system has seen all data object changes that the exporting system knows about up to a given vector clock indicating by the lock ack vector clock.

Process for Importing a Replication Chunk

Figure 8:
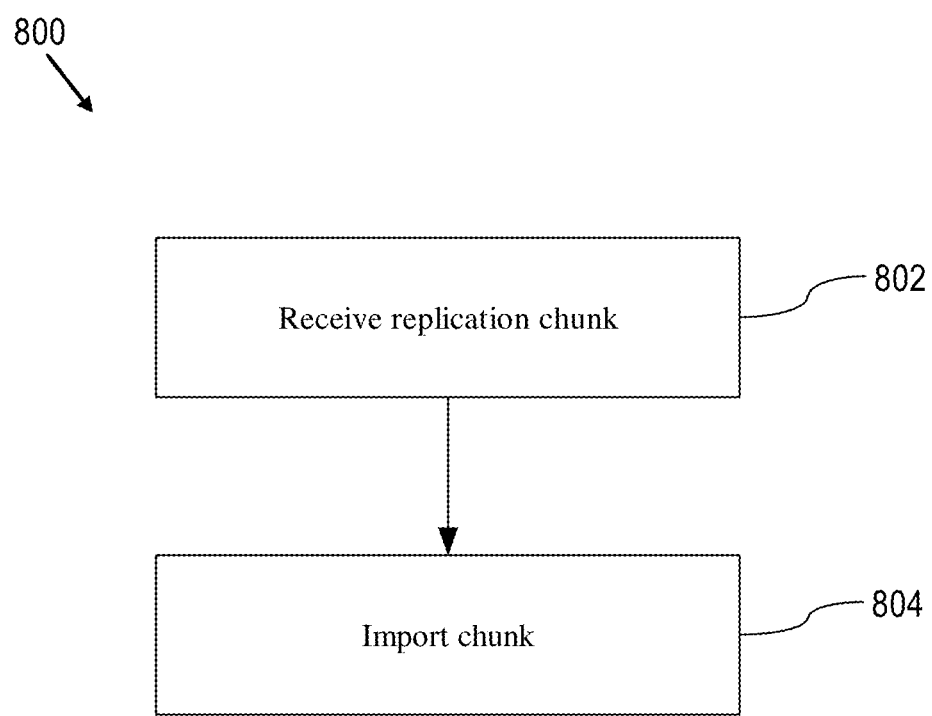
FIG. 8 is a flowchart illustrating a computer-implemented process for importing a replication chunk of an incremental replication job.

FIG. 8 is a flow diagram illustrating a process performed by the importing system for importing a replication chunk according to an embodiment of the invention. The process illustrated in FIG. 8 may be performed by one or more computing devices. For example, the process illustrated in FIG. 8 may be performed by one or more analysis servers 104 of the importing system.

At step 802, the importing system receives a replication chunk of an incremental replication job from the exporting system. For example, the importing system may receive the chunk from the exporting system over a data network or from portable physical media (e.g., a USB drive or a flash drive) physically transported from the exporting system to the importing system. Among other information including change data, the chunk contains an identifier of the incremental replication job that the chunk is a part of. In addition, the chunk contains a chunk identifier. For example, the received chunk may contain plan identifier 132 from the corresponding replication plan 130 created by the exporting system and chunk identifier 142 from the corresponding replication chunk specification 140. The identifier of the job may be used by the importing system to determine the replication job to which the received chunk belongs to. The identifier of the chunk may be used by the importing system to determine the order of the received chunk in the sequence of chunks the exporting system has broken the job into.

In some embodiments, the exporting system assigns the first chunk in the sequence of chunks of a replication job an initial ordinal such as the number 1. Each chunk thereafter is assigned the next ordinal relative to the ordinal assigned to previous chunk. For example, the second chunk in the sequence can be assigned the number 2, the third chunk in the sequence assigned the number 3, and so on. An alternative ordinal sequence could be 'A', 'B', 'C', 'D' . . . , for example.

In some embodiments, the exporting system includes "final chunk" information in the last chunk in the sequence of chunks to indicate to the importing system that the chunk is the last chunk of the job. For example, the final chunk information can be a flag or other data that indicates to the importing system that the chunk having the final chunk information is the last chunk of the job.

At step 804, the importing system imports the replication chunk received at step 802 into the revisioning database at the importing system. This importing includes incorporating the change data contained in the replication chunk into the revisioning database. Importing the change data may include performing causality detection between the change data in the chunk and change data already stored in the revisioning database. In particular, change data in the chunk and existing change data in the revisioning database at the importing system may be versioned with version vectors (also known as "vector clocks") suitable for detecting causality relationships between the change data in the replication chunk and corresponding change data in the revisioning database. In particular, the version vectors may be used to determine whether change data in the chunk "happened after", "happened before", or neither "happened after" nor "happened before" corresponding change data in the revisioning database. Change data in the chunk is incorporated into the revisioning database at the importing system if the change data "happened after" the corresponding change data in the revisioning database. Change data in the chunk is not incorporated into the revisioning database at the importing system if the change data "happened before" the corresponding change data in the revisioning database. If change data in the chunk neither "happened after" nor "happened before" the corresponding change data in the revisioning database, then a conflict exists between the change data in the chunk and the corresponding change in the revisioning database. In some scenarios, the conflict is automatically resolved by the importing system. In other scenarios, a user must manually resolve the conflict. In both cases, the resolution of the conflict is incorporated into the revisioning database after the conflict is resolved. More information on the "happened before" and the "happened after" relations between events in a distributed computing system can be found in a paper by Leslie Lamport entitled "Time, Clocks and the Ordering of Events in a Distributed System", Communications of the ACM, 21(7), pp. 558-565 (1978), the entire contents of which is hereby incorporated by reference as if fully set forth herein.

Implementation Mechanism

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
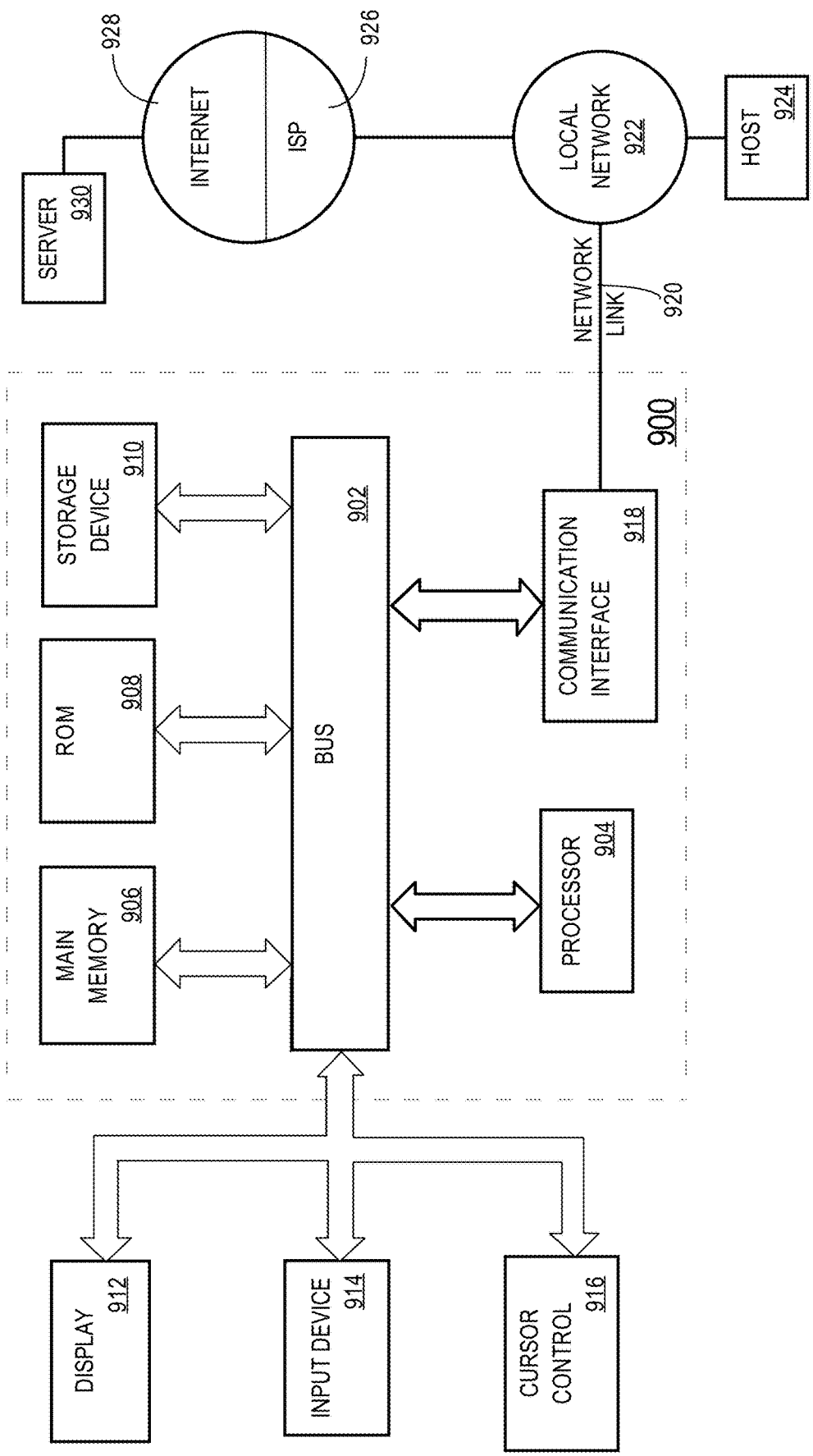
FIG. 9 is a block diagram of a computer system on which embodiments of the present invention may be implemented.

For example, FIG. 9 illustrates a computer system upon which one or more embodiments may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method performed by a computing system comprising one or more processors and storage media storing one or more programs, the one or more programs comprising instructions executed by the one or more processors to perform the method, the method comprising:
   receiving, at an importing system, from an exporting system, a plurality of replication chunks of an incremental replication job, wherein a replication chunk of the plurality of replication chunks contains a respective chunk identifier and respective change data;
   performing, at the importing system, causality detection between the respective change data in the replication chunk received at the importing system and existing change data at the importing system; and
   based at least in part on results of the causality detection, importing the replication chunk of the plurality of replication chunks into the importing system by: (a) superseding the existing change data already at the importing system with the respective change data in the replication chunk, (b) not superseding the existing change data already at the importing system with the respective change data in the replication chunk, or (c) determining that a concurrency conflict exists between the respective change data in the replication chunk and the existing change data at the importing system.

2. The method of claim 1, wherein the respective chunk identifier for the replication chunk is used by the importing system to determine an order of the replication chunk in a sequence of the plurality of replication chunks that the exporting system has broken the incremental replication job into.

3. The method of claim 1, wherein the performing the causality detection is based, at least in part, on using version vectors for versioning the respective change data in the replication chunk and the existing change data at the importing system, wherein the version vectors are used to determine whether the respective change data in the replication chunk happened after, happened before or neither happened after nor happened before the existing change data at the importing system.

4. The method of claim 3, wherein,
   in response to determining that the change data in the replication chunk happened after the existing change data at the importing system, superseding the existing change data at the importing system with the respective change data in the replication chunk;
   in response to determining that the change data in the replication chunk happened before the existing change data at the importing system, not superseding the existing change data at the importing system with the respective change data in the replication chunk; and
   in response to determining that change data in the replication chunk neither happened before nor happened after the existing change data at the importing system, determining that a concurrently conflict exists between the respective change data in the replication chunk and the existing change data at the importing system.

5. The method of claim 4, wherein in response to resolution of the concurrency conflict, superseding the existing change data at the importing system with results of the resolution of the concurrency conflict.

6. The method of claim 5, wherein resolution of the concurrency conflict is based at least in part on user input provided by a user, the user input selecting one of: (a) the respective change data in the replication chunk, or (b) the existing change data at the importing system.

7. One or more non-transitory computer-readable media storing instructions which, when executed by one or more processors, causes:
   receiving, at an importing system, from an exporting system, a plurality of replication chunks of an incremental replication job, wherein a replication chunk of the plurality of replication chunks contains a respective chunk identifier and respective change data;
   performing, at the importing system, causality detection between the respective change data in the replication chunk received at the importing system and existing change data at the importing system; and
   based at least in part on results of the causality detection, importing the replication chunk of the plurality of replication chunks into the importing system by: (a) superseding, at the importing system, the existing change data already stored at the importing system with the respective change data in the replication chunk, (b) not superseding, at the importing system, the existing change data already stored at the importing system with the respective change data in the replication chunk, or (c) determining that a concurrency conflict exists between the respective change data in the replication chunk and the existing change data already stored at the importing system.

8. The one or more non-transitory computer-readable media of claim 7, wherein the respective chunk identifier for the replication chunk is used by the importing system to determine an order of the replication chunk in a sequence of plurality of replication chunks that the exporting system has broken the incremental replication job into.

9. The one or more non-transitory computer-readable media of claim 7, wherein the performing the causality detection is based, at least in part, on using version vectors for versioning the respective change data in the replication chunk and the existing change data at the importing system, wherein the version vectors are used to determine whether the respective change data in the replication chunk happened after, happened before or neither happened after nor happened before the existing change data at the importing system.

10. The one or more non-transitory computer-readable media of claim 9, wherein,
in response to determining that the change data in the replication chunk happened after the existing change data at the importing system, superseding the existing change data at the importing system with the respective change data in the replication chunk;
in response to determining that the change data in the replication chunk happened before the existing change data at the importing system, not superseding the existing change data at the importing system with the respective change data in the replication chunk; and
in response to determining that change data in the replication chunk neither happened before nor happened after the existing change data at the importing system, determining that a concurrency conflict exists between the respective change data in the replication chunk and the existing change data at the importing system.

11. The one or more non-transitory computer-readable media of claim 10, wherein in response to resolution of the concurrency conflict, superseding the existing change data at the importing system with results of the concurrency conflict resolution.

12. The one or more non-transitory computer-readable media of claim 11, wherein resolution of the concurrency conflict is based at least in part on user input provided by a user, the user input selecting one of: (a) the respective change data in the replication chunk, or (b) the existing change data at the importing system.

13. A system comprising:
a database;
an importing system comprising one or more computer-readable media and one or more processors, the one or more computer-readable media storing instructions which, when executed by the one or more processors, causes:
receiving, at the importing system, from an exporting system, a plurality of replication chunks of an incremental replication job, wherein the replication chunk contains a respective chunk identifier and respective change data;
performing, at the importing system, causality detection between the respective change data in the replication chunk received at the importing system and existing change data at the importing system; and
based at least in part on results of the causality detection, importing the replication chunk into the importing system by: (a) superseding, at the importing system, the existing change data already stored at the importing system with the respective change data in the replication chunk, (b) not superseding, at the importing system, the existing change data already stored at the importing system with the respective change data in the replication chunk, or (c) determining that a concurrency conflict exists between the respective change data in the replication chunk and the existing change data already stored at the importing system.

14. The system of claim 13, wherein the respective chunk identifier is used by the importing system to determine an order of the replication chunk in a sequence of plurality of replication chunks that the exporting system has broken the incremental replication job into.

15. The system of claim 14, wherein the performing the causality detection is based, at least in part, on using version vectors for versioning the change data in the replication chunk and the existing change data at the importing system, wherein the version vectors are used to determine whether the respective change data in the replication chunk happened after, happened before or neither happened after nor happened before the existing change data at the importing system.

16. The system of claim 15, wherein,
in response to determining that the change data in the replication chunk happened after the existing change data at the importing system, superseding the existing change data at the importing system with the respective change data in the replication chunk;
in response to determining that the change data in the replication chunk happened before the existing change data at the importing system, not superseding the existing change data at the importing system with the respective change data in the replication chunk; and
in response to determining that change data in the replication chunk neither happened before nor happened after the existing change data at the importing system, determining that a concurrency conflict exists between the respective change data in the replication chunk and the existing change data at the importing system.

17. The system of claim 16, wherein in response to resolution of the concurrency conflict, superseding the existing change data at the importing system with results of the concurrency conflict resolution.

18. The system of claim 17, wherein resolution of the concurrency conflict is based at least in part on user input provided by a user, the user input selecting one of: (a) the respective change data in the replication chunk, or (b) the existing change data at the importing system.

19. The method of claim 1, further comprising:
receiving the plurality of replication chunks at the importing system in a first order;
wherein each replication chunk of the plurality of replication chunks has a respective chunk identifier and respective chunk data;
determining a second order of the plurality of replication chunks based on the respective chunk identifiers of the plurality of replication chunks;
wherein the first order is different than the second order; and
performing causality detection at the importing system for each replication chunk of the plurality of replication chunks in the second order of the plurality of replication chunks.

20. The one or more non-transitory computer-readable media of claim 7, further comprising instructions which, when executed by one or more processors, causes:
receiving the plurality of replication chunks at the importing system in a first order;
wherein each replication chunk of the plurality of replication chunks has a respective chunk identifier and respective chunk data;
determining a second order of the plurality of replication chunks based on the respective chunk identifiers of the plurality of replication chunks;
wherein the first order is different than the second order; and
performing causality detection at the importing system for each replication chunk of the plurality of replication chunks in the second order of the plurality of replication chunks.

21. The system of claim 15, wherein the one or more computer-readable media of the importing system further comprise instructions which, when executed by the one or more processors, causes:

receiving the plurality of replication chunks at the importing system in a first order;
wherein each replication chunk of the plurality of replication chunks has a respective chunk identifier and respective chunk data;
determining a second order of the plurality of replication chunks based on the respective chunk identifiers of the plurality of replication chunks;
wherein the first order is different than the second order; and
performing causality detection at the importing system for each replication chunk of the plurality of replication chunks in the second order of the plurality of replication chunks.

\* \* \* \* \*